US012756009B2

(12) United States Patent
Chae et al.

(10) Patent No.: US 12,756,009 B2
(45) Date of Patent: Oct. 6, 2026

(54) ELECTROLYTE MATERIAL INCLUDING OXYGEN-CONTAINING NEUTRAL ELECTROPHILIC COMPOUND AND LITHIUM SALT, AND ALL-SOLID-STATE BATTERY INCLUDING THE SAME

(71) Applicant: LG Energy Solution, Ltd., Seoul (KR)

(72) Inventors: Jong-Hyun Chae, Daejeon (KR); Sangheon Lee, Seoul (KR); Jiwon Yu, Seoul (KR)

(73) Assignee: LG Energy Solution, Ltd., Seoul (KR)

(*) Notice: Subject to any disclaimer, the term of this patent is extended or adjusted under 35 U.S.C. 154(b) by 592 days.

(21) Appl. No.: 18/026,337

(22) PCT Filed: Mar. 23, 2022

(86) PCT No.: PCT/KR2022/004095
§ 371 (c)(1),
(2) Date: Mar. 14, 2023

(87) PCT Pub. No.: WO2022/203405
PCT Pub. Date: Sep. 29, 2022

(65) Prior Publication Data

US 2023/0352732 A1 Nov. 2, 2023

(30) Foreign Application Priority Data

Mar. 25, 2021 (KR) ........................ 10-2021-0039179

(51) Int. Cl.
*H01M 10/0565* (2010.01)

(52) U.S. Cl.
CPC .................. *H01M 10/0565* (2013.01); *H01M 2300/0082* (2013.01)

(58) Field of Classification Search
CPC ................................................ H01M 10/0565
USPC ........................................ 429/188, 323, 341
See application file for complete search history.

(56) References Cited

U.S. PATENT DOCUMENTS

| | | | |
|---|---|---|---|
| 9,742,000 B2 | 8/2017 | Lee et al. | |
| 2013/0137002 A1 | 5/2013 | Lee et al. | |
| 2014/0377621 A1 | 12/2014 | Hanyu et al. | |
| 2017/0018781 A1 | 1/2017 | Zimmerman | |

(Continued)

FOREIGN PATENT DOCUMENTS

| | | | |
|---|---|---|---|
| CN | 105098235 A | 11/2015 | |
| CN | 111740156 A | 10/2020 | |

(Continued)

OTHER PUBLICATIONS

"Component." In New Oxford American Dictionary, edited by Stevenson, Angus, and Christine A. Lindberg. : Oxford University Press, 2010. https://www.oxfordreference.com/view/10.1093/acref/9780195392883.001.0001/m_en_us1234985. (Year: 2010).*

(Continued)

*Primary Examiner* — Sean P Cullen
(74) *Attorney, Agent, or Firm* — Bryan Cave Leighton Paisner LLP

(57) ABSTRACT

An electrolyte material and an all-solid-state battery comprising the same are provided. The electrolyte material comprises a lithium salt and an electrophilic molecule, and has high ion conductivity and improved manufacturing and processing characteristics.

12 Claims, 17 Drawing Sheets

(56) References Cited

U.S. PATENT DOCUMENTS

| | | | |
|---|---|---|---|
| 2021/0242501 | A1 | 8/2021 | Sakamoto et al. |
| 2023/0352726 | A1 | 11/2023 | Zimmerman et al. |

FOREIGN PATENT DOCUMENTS

| | | | | | |
|---|---|---|---|---|---|
| CN | 111740157 | A | | 10/2020 | |
| CN | 112086678 | A | | 12/2020 | |
| CN | 112420986 | A | | 2/2021 | |
| CN | 114976212 | A | * | 8/2022 | .......... H01M 10/056 |
| JP | 2000-268871 | A | | 9/2000 | |
| JP | 2018-521461 | A | | 8/2018 | |
| JP | 2019-200880 | A | | 11/2019 | |
| JP | 2020053229 | A | * | 4/2020 | |
| KR | 10-2013-0060912 | A | | 6/2013 | |
| KR | 10-2018-0035780 | A | | 4/2018 | |
| KR | 10-2018-0036650 | A | | 4/2018 | |
| KR | 10-2018-0124540 | A | | 11/2018 | |
| KR | 10-2018-0124546 | A | | 11/2018 | |
| KR | 20180124540 | A | * | 11/2018 | ............ C08J 5/2206 |
| KR | 20180124546 | A | * | 11/2018 | ............ C08J 5/2206 |
| KR | 10-2019-0004721 | A | | 1/2019 | |
| KR | 10-2020-0011694 | A | | 2/2020 | |
| KR | 10-2020-0076074 | A | | 6/2020 | |
| KR | 20200076074 | A | * | 6/2020 | .......... H01M 10/052 |
| WO | 2013/051308 | A1 | | 4/2013 | |
| WO | 2016/196873 | A1 | | 12/2016 | |
| WO | 2016197098 | A1 | | 12/2016 | |
| WO | 2017/192163 | A1 | | 11/2017 | |

OTHER PUBLICATIONS

Hatakeyama-Sato et al., "AI-Assisted Exploration of Superionic Glass-Type Li+ Conductors with Aromatic Structures" J. Am. Chem. Soc. (2020), vol. 142, No. 7, pp. 3301-3305.

* cited by examiner

FIG. 6b

| CHL/LiTFSI | Total O | CN O | Free O (Total O-CN O) | Vacancy site ( O cage ) |
|---|---|---|---|---|
| 0 | 4 | 4 | 0 | 0 |
| 1 | 6 | 3.5 | 2.5 | 0.7 |
| 2 | 8 | 3.5 | 4.5 | 1.2 |
| 3 | 10 | 3 | 7 | 2.3 |

FIG. 8

| CHL-to-LiTFSI ratio → | 0:1 | 1:1 | 2:1 | 3:1 |
|---|---|---|---|---|
| LiTFSI | 15 | 8 | 5 | 5 |
| CHL | - | 8 | 10 | 15 |

FIG. 9

| CHL/TFSI ratio | $Li^+$ ion conductivity @25°C | $TFSI^-$ ion conductivity @25°C | Ion conductivity ($\sigma^+ + \sigma^-$) | Li cation transference number @25°C ($\sigma^+/(\sigma^+ + \sigma^-)$) |
|---|---|---|---|---|
| 1 | $8.57 \times 10^{-4}$ | $2.08 \times 10^{-3}$ | $2.94 \times 10^{-3}$ | 0.29 |
| 2 | $1.35 \times 10^{-3}$ | $1.83 \times 10^{-3}$ | $3.18 \times 10^{-3}$ | 0.42 |
| 3 | $4.87 \times 10^{-4}$ | $1.35 \times 10^{-3}$ | $1.84 \times 10^{-3}$ | 0.26 |

FIG. 11

| | CHL/LITFSI | | | CHL/LITFSI/PPS | |
|---|---|---|---|---|---|
| CHL : LITFSI Ratio | 3 : 1 | 2 : 1 | 1 : 1 | 3 : 1(4nm) | 3 : 1(2nm) |
| Li ion Diffusivity@300K ($cm^2/s$) | 8.67*E-08 | 1.77*E-07 | 7.45*E-08 | 6.44*E-09 | 6.44*E-09 |
| Overall Conductivity@300K (S/cm) | 1.84*E-03 | 3.18*E-03 | 2.94*E-03 | 4.31*E-04 | 7.607*E-05 |
| Li ion Conductivty@300K (S/cm) | 4.87*E-04 | 1.35*E-03 | 8.57*E-04 | 1.03*E-04 | 2.25*E-05 |
| Li ion Transference Number | 0.265 | 0.425 | 0.292 | 0.103 | 0.296 |
| Overall Conductance (S) | 0.920 | 1.590 | 1.470 | 0.216 | 0.038 |

ELECTROLYTE MATERIAL INCLUDING OXYGEN-CONTAINING NEUTRAL ELECTROPHILIC COMPOUND AND LITHIUM SALT, AND ALL-SOLID-STATE BATTERY INCLUDING THE SAME

CROSS REFERENCE WITH RELATED APPLICATION(S)

This application is a National Stage Application of International Application No. PCT/KR2022/004095, filed on Mar. 23, 2022, which claims priority to Korean Patent Application No. 10-2021-0039179 filed on Mar. 25, 2021, the disclosures of which are incorporated herein by reference in their entirety.

FIELD

The present disclosure relates to an electrolyte material for an all-solid-state battery and an all-solid-state battery comprising the same.

BACKGROUND

Solid electrolytes are largely classified into polymer-based, oxide-based and sulfide-based solid electrolytes. Compared to the oxide- or sulfide-based solid electrolytes, the polymer-based solid electrolytes have a low ion conductivity disadvantage, but exhibit low contact resistance at the interface with active materials, lead to an easy battery fabrication process and have low density, contributing to the increased energy density of batteries. Since P. V. Wright group first discovered the ion conductivity of the polymer electrolytes in the poly(ethylene oxide) (PEO) polymer-alkali salt complex in the 1970s, M. Armand et al. found many applications of the polymer electrolytes in lithium batteries and electrochemistry. The requirements for the polymer electrolytes are high mobility of polymer chains at room temperature by low glass transition temperature, and the inclusion of electron-donating heteroatoms such as oxygen, nitrogen and sulfur for the smooth dissociation of the lithium salt. To meet the requirements, many studies have been made on candidate materials of the polymer electrolytes having high ion conductivity and high mechanical strength, for example, polymers including PEO, polyacetonitrile (PAN), polydimethylsiloxane (PDMS), poly(methyl methacrylate) (PMMA) and polyvinylidenefluride (PVdF). Among them, especially, the PEO based polymer electrolytes have been intensively studied, but the low ion conductivity of $10^{-5}$ S/cm at room temperature puts limitations on commercialization.

The polymer electrolytes are largely classified into dry polymer electrolyte comprising a polymer and a lithium salt and gel polymer electrolyte comprising a liquid component as an additive. The gel polymer electrolytes exhibit the ion conductivity of about $10^{-4}$~$10^{-3}$ S/cm at room temperature, and the polymer acts as a support of the liquid electrolyte and the liquid additive is responsible for salt dissociation and movements of polymer chains which promotes ion transport. The liquid additive usually includes carbonate-based, ether-based and ester-based, and the chemical and electrochemical stability in the working potential range of the positive/negative electrode of the battery, low vapor pressure and high compatibility with the polymer are required. In general, compared to the dry polymer electrolytes, the gel polymer electrolytes have a high ion conductivity advantage, but in many cases, since the gel polymer electrolytes contain flammable liquids, there are safety risks of lithium batteries.

Meanwhile, U.S. Pat. No. 9,742,000 B2 discloses a polyphenylene sulfide (PPS) polymer-based solid electrolyte, and the ion conductivity at room temperature amounts to $1\times10^{-3}$ S/cm. According to the patent, the polymer electrolyte comprises PPS, a dopant and a lithium salt, the polymer is in a glassy state at room temperature, the higher degree of crystallinity of the polymer improves the ion conduction, and presumably, the formation of a charge transfer complex of the polymer and the dopant is a factor that enables the mobility of the lithium ions. This is a quite contrast to PEO based polymer electrolyte in which the lithium ions move by the segmental motion of the polymer in a rubbery state, and as the degree of crystallinity of the polymer is lower, the ion conductivity is higher.

Since the PPS-based polymer electrolyte is a three-component system electrolyte comprising PPS, a dopant and a lithium salt, each component is a solid having high melting point, so it is not easy to mix and process each component in preparing the solid electrolyte, which makes it difficult to achieve the ion conductivity.

SUMMARY

Technical Problem

The present disclosure is directed to providing an electrolyte material for an all-solid-state battery with high ion conductivity and improved manufacturing and processing characteristics. Meanwhile, other objectives and advantages of the present disclosure will be understood by the following description. Additionally, it will be easily understood that these and other objectives and advantages of the present disclosure may be achieved by the means or methods set forth in the appended claims and a combination thereof.

Technical Solution

The present disclosure relates to an electrolyte material for an all-solid-state battery.

A first aspect of the present disclosure relates to an electrolyte material for an all-solid-state battery, the electrolyte material comprising a lithium salt and an electrophilic molecule, wherein the electrophilic molecule is a compound which is electrically neutral, comprises an oxygen atom (0) in its molecular structure, and has a chemical resonance structure, and the lithium salt comprises lithium bis(fluorosulfonyl)imide (LiFSI), lithium bis(trifluoromethanesulfonyl)imide (LiTFSI), (lithium bis(pentafluoroethanesulfonyl)imide (LiBETI), LiCTFSI ($LiN(C_2F_4S_2O_4)$), $LiN(CN)_2$, $LiBF_4$, $LiClO_4$, $LiPF_6$, $Li(CF_3)_2PF_4$, $Li(CF_3)_3PF_3$, $Li(CF_3)_4PF_2$, $Li(CF_3)_5PF$, $Li(CF_3)_6P$, $LiCF_3SO_3$, $LiCF_3CF_2SO_3$, $LiCF_3CF_2(CF_3)_2CO$, $Li(CF_3SO_2)_2CH$, $(SF_5)_3C$, $Li(CF_3SO_2)_3C$, $LiCF_3(CF_2)_7SO_3$, $LiCF_3CO_2$, $LiCH_3CO_2$, LiSCN or two or more thereof.

In a second aspect of the present disclosure, the electrophilic molecule comprises a benzoquinone-based compound.

In a third aspect of the present disclosure according to the second aspect, one or more hydrogens of the benzoquinone-based compound are each independently substituted with a functional group having a cyano group (CN), chloride (Cl) or bromide (Br).

In a fourth aspect of the present disclosure according to any one of the first to third aspects, the electrophilic molecule comprises benzoquinone, 2,3-dicyano-5,6-dichlorobenzoquinone (DDQ), chloranil, bromanil, p-chloranilic acid or two or more thereof.

In a fifth aspect of the present disclosure according to any one of the first to fourth aspects, the lithium salt comprises LiFSI, LiTFSI, LiBETI, LiCTFSI or two or more thereof.

In a sixth aspect of the present disclosure according to any one of the first to fifth aspects, a molar ratio of the electrophilic molecule to the lithium salt (the electrophilic molecule/the lithium salt) is 1 to 3.

In a seventh aspect of the present disclosure according to any one of the first to sixth aspects, the electrophilic molecule comprises one or more benzoquinone-based compounds, and the lithium salt comprises LiFSI, LiTFSI, LiBETI, LiCTFSI or two or more thereof, and a molar ratio of the electrophilic molecule to the lithium salt (the electrophilic molecule/the lithium salt) is 0 to 3.

In an eighth aspect of the present disclosure according to any one of the first to seventh aspects, the electrolyte material comprises LiTFSI as the lithium salt, and chloranil as the electrophilic molecule.

In a ninth aspect of the present disclosure according to the eighth aspect, the electrolyte material comprises LiTFSI as the lithium salt and chloranil as the electrophilic molecule, and a molar ratio of the electrophilic molecule to the lithium salt (the electrophilic molecule/the lithium salt) is 1 to 3.

Additionally, the present disclosure relates to an all-solid-state battery comprising the electrolyte material for an all-solid-state battery according to the present disclosure, and the all-solid-state battery comprises a negative electrode, a positive electrode and a solid electrolyte membrane between the negative electrode and the positive electrode, wherein one or more of the negative electrode, the positive electrode or the solid electrolyte membrane comprises the electrolyte material according to the present disclosure.

Advantageous Effects

The electrolyte material of the present disclosure has high ion conductivity of $1\times10^{-3}$ S/cm or more at room temperature and is easy to manufacture or process.

BRIEF DESCRIPTION OF DRAWINGS

The accompanying drawings illustrate an exemplary embodiment of the present disclosure, and together with the detailed disclosure, serve to provide a further understanding of the technical aspects of the present disclosure, and the present disclosure should not be construed as being limiting to the drawings. In the drawings, for clarity of description, the shape, size, scale or proportion of the elements may be exaggerated for emphasis.

FIGS. 6*a* and 6*b* are a graph and a table showing the number of lithium ion hopping sites vs. CHL/LiTFSI ratio.

FIG. 8 shows a table of CHL and LiTFSI molecular number with respect to CHL/LiTFSI ratio in a supercell used in ab initio molecular dynamics (AIMD) simulation.

FIG. 9 shows a table of lithium ion diffusion coefficient, TFSI anion diffusion coefficient and lithium cation transference number at room temperature (25° C.) with respect to CHL/LiTFSI ratio.

FIG. 11 shows a comparison of ion conductivity between example (CHL/LiTFSI) and comparative example (CHL/LiTFSI/PPS).

DETAILED DESCRIPTION

Figure 1:
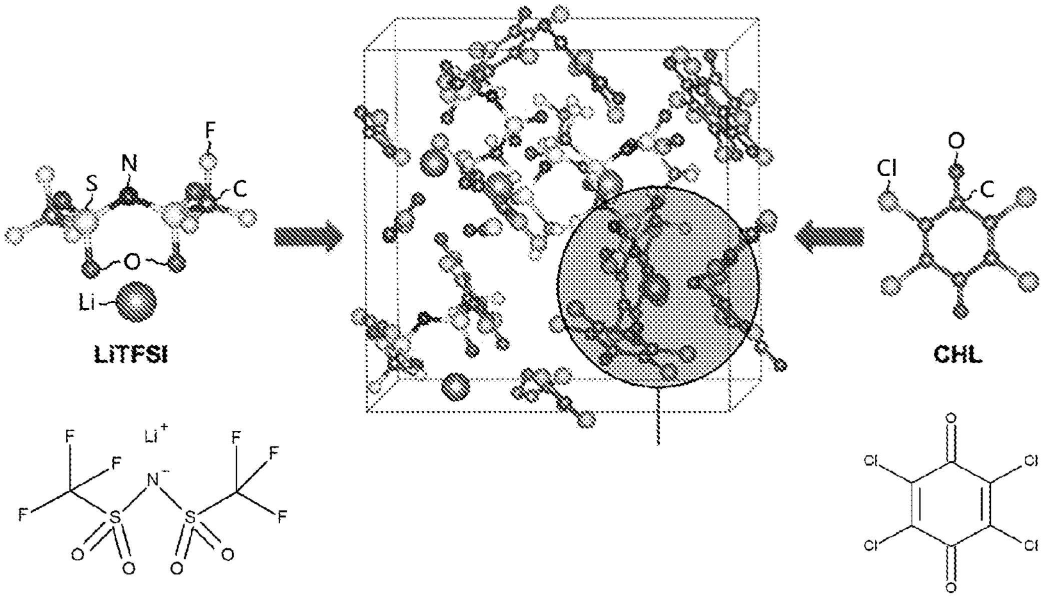
FIG. 1 shows a model for a CHL/LiTFSI two-component system electrolyte material obtained through Ab initio molecular dynamics (AIMD) simulation, in which lithium (Li), oxygen (O), carbon (C), sulfur (S), nitrogen (N), fluorine (F) and chloride (Cl) atoms are separately shown.

Hereinafter, the embodiments of the present disclosure will be described in detail. Prior to the description, it should be understood that the terms or words used in the specification and the appended claims should not be construed as limited to general and dictionary meanings, but rather interpreted based on the meanings and concepts corresponding to the technical aspects of the present disclosure on the basis of the principle that the inventor is allowed to define terms appropriately for the best explanation. Therefore, the context in the embodiments described herein is just an exemplary embodiment of the present disclosure, but not intended to fully describe the technical aspects of the present disclosure, so it should be understood that other equivalents and modifications could have been made thereto at the time the application was filed.

The term 'comprise(s)' or 'include(s)' when used in this specification, specifies the presence of stated elements, but does not preclude the presence or addition of one or more other elements, unless the context clearly indicates otherwise.

The terms 'about' and 'substantially' are used herein in the sense of at, or nearly at, when given the manufacturing and material tolerances inherent in the stated circumstances and are used to prevent the unscrupulous infringer from unfairly taking advantage of the present disclosure where exact or absolute figures are stated as an aid to understanding the present disclosure.

'A and/or B' when used in this specification, specifies 'either A or B or both'.

The terms as used in the following detailed description are for the purpose of convenience, but not intended to being limiting. The terms 'right', 'left' 'top' and 'bottom' refer to the directions in the drawings to which reference is made. The terms 'inward' and 'outward' refer to the directions toward or away from the geometrical centers of the designated devices, systems and elements thereof. The terms 'front', 'rear', 'up', 'down' and related words and phrases refer to the locations and directions in the drawings to which reference is made and are not limiting. These terms include the above words and their derivatives and synonyms.

The present disclosure relates to an electrolyte material for an all-solid-state battery. Additionally, the present disclosure relates to an all-solid-state battery comprising the electrolyte material.

In an embodiment of the present disclosure, the electrophilic molecule preferably is electrically neutral and has a molecular structure in which electrons are distributed so as to form chemical resonance by bonding oxygen (O), that has a strong interaction with Li, to a benzene aromatic group as a functional group. The electrophilic molecule may exhibit the properties of an electron acceptor and/or an oxidizing agent.

In an embodiment of the present disclosure, the electrophilic molecule may comprise at least one benzoquinone-based compound. When one or more hydrogens H of the benzoquinone are replaced with chloride (Cl), bromide (Br) or a functional group having a cyano group (CN), electrophilicity may be maximized to form a stronger interaction with lithium.

In an embodiment of the present disclosure, the electrophilic molecule may comprise one or more selected from benzoquinone, 2,3-dicyano-5,6-dichlorobenzoquinone ($C_6Cl_2N_2O_2$) (DDQ), tetrachloro-1,4-benzoquinone ($C_6Cl_4O_2$) (chloranil), bromanil and p-chloranilic acid.

Additionally, in an embodiment of the present disclosure, the lithium salt may comprise lithium bis(fluorosulfonyl) imide (LiFSI), lithium bis(trifluoromethanesulfonyl)imide (LiTFSI), lithium bis(pentafluoroethanesulfonyl)imide (LiBETI), LiCTFSI ($LiN(C_2F_4S_2O_4)$), $LiN(CN)_2$, $LiBF_4$, $LiClO_4$, $LiPF_6$, $Li(CF_3)_2PF_4$, $Li(CF_3)_3PF_3$, $Li(CF_3)_4PF_2$, $Li(CF_3)_5PF$, $Li(CF_3)_6P$, $LiCF_3SO_3$, $LiCF_3CF_2SO_3$, $LiCF_3CF_2(CF_3)_2CO$, $Li(CF_3SO_2)_2CH$, $(SF_5)_3C$, $Li(CF_3SO_2)_3C$, $LiCF_3(CF_2)_7SO_3$, $LiCF_3CO_2$, $LiCH_3CO_2$, LiSCN or two or more thereof.

Preferably, the lithium salt comprises LiFSI, LiTFSI, LiBETI, LiCTFSI or two or more thereof.

In an embodiment of the present disclosure, when the electrophilic molecule comprises one or more benzoquinone-based compounds, a molar ratio of the electrophilic molecule to the lithium salt (the electrophilic molecule/the lithium salt) in the electrolyte material may be 1 to 3. Specifically, the molar ratio of the electrophilic molecule to the lithium salt (the electrophilic molecule/the lithium salt) may be, for example, 1 to 2 or 2 to 3. The molar ratio of the electrophilic molecule to the lithium salt (the electrophilic molecule/the lithium salt) may be preferably 1 to 2 in terms of the ion conductivity of the electrolyte material.

Additionally, in a more specific embodiment of the present disclosure, when the electrophilic molecule comprises at least one benzoquinone-based compound and the lithium salt comprises one or more of LiFSI, LiTFSI, LiBETI or LiCTFSI, the molar ratio of the electrophilic molecule to the lithium salt (the electrophilic molecule/the lithium salt) in the electrolyte material may be 1 to 3. Specifically, the molar ratio of the electrophilic molecule to the lithium salt (the electrophilic molecule/the lithium salt) may be, for example, 1 to 2 or 2 to 3. The molar ratio of the electrophilic molecule to the lithium salt (the electrophilic molecule/the lithium salt) may be preferably 1 to 2 in terms of the ion conductivity of the electrolyte material.

For the electrolyte material to exhibit the lithium ion conductivity, lithium ions in the electrolyte material need to be mobile. To this end, it is necessary to produce mobile lithium ions, and hopping sites for the movement of the lithium ions are necessary.

In the electrolyte material comprising the electrophilic molecule/the lithium salt according to the present disclosure, the lithium ion conductivity based on the interaction between molecules is affected by coupling between atoms having high electrophilicity such as oxygen of the electrophilic molecule and lithium atoms of the lithium salt. In the absence of the electrophilic molecule, lithium atoms in the lithium salt such as LiTFSI are strongly coordinated to oxygen atoms of the lithium salt, and thus there is no hopping sites, namely, vacancy sites for lithium hopping. In the case of LiTFSI, lithium atoms are strongly coordinated by four oxygen atoms of TFSI. However, in the electrolyte material comprising the electrophilic molecule and the lithium salt such as chloranil, the oxygen atoms of the lithium salt that surround lithium are gradually replaced with the oxygen atoms of the electrophilic molecule, Li—O bonds are weakened and the coordination number of Li—O decreases. As a result, free oxygen atoms (Li-free O) that are not bonded to lithium are created to form an oxygen (O) cage, which may be provided as lithium ion hopping sites. That is, with the increasing molar ratio of the electrophilic molecule to the lithium salt by the mixing of the lithium salt and the electrophilic molecule, the lithium separation energy reduces and lithium ion hopping sites increase, and accordingly, the lithium ions become more mobile, and by proportion, the ion conductivity of the electrolyte material increases.

In an embodiment of the present disclosure, the electrolyte material may comprise chloranil (CHL) as the electrophilic molecule and LiTFSI as the lithium salt. As described above, as the CHL/LiTFSI molar ratio in the electrolyte material increases, lithium ions become more mobile, and proportionately, the ion conductivity of the electrolyte material increases. In the case of the CHL/LiTFSI two-component system electrolyte material, even when the amount of CHL which includes two oxygen atoms (O) in one molecule structure increases, the total coordination number (CN) of Li—O does not exceed 4. Instead, the number of free oxygen atoms (referred to as 'Free O') not coordinating with Li increases, and the oxygen cage of free O provides lithium ion hopping sites. This enables vacancy-mediated Li ion migration having comparatively low activation energy.

The role of the electrophilic molecule based on its molecule structure in the CHL/LiTFSI two-component system electrolyte material will be described below.

CHL has a structure in which six H atoms of benzene are replaced with four Cl atoms and two O atoms. Basically, this structure is more electrophilic than benzoquinone due to the electrophilic Cl atoms. CHL acts as an electron acceptor and Li acts as an electron donor. The electrons transferred during the interaction between O of CHL and Li are stabilized by delocalization in the chemical resonance structure formed by the aromatic ring and the C═O group.

The charge polarization between Li and O of CHL forms Li—O coordination bonds and is not stronger than Li—O bonds of LiTFSI. Accordingly, when the two-component system electrolyte material is composed of the electrophilic molecule having the chemical resonance group and the lithium salt, it can provide high ion conductivity as an electrolyte material for an all-solid-state battery.

Additionally, the present disclosure provides an all-solid-state battery comprising the electrolyte material. The all-solid-state battery may comprise a positive electrode, a negative electrode and a solid electrolyte membrane, and one or more of the positive electrode, the negative electrode or the solid electrolyte membrane may comprise the electrolyte material having the above-described features.

In an embodiment of the present disclosure, the solid electrolyte membrane is an ion conducting sheet that is interposed between the positive electrode and the negative electrode in the all-solid-state battery and acts as an insulating and ion conducting channel, and preferably has ion conductivity of $1.0\times10^{-5}$ S/cm or more. The solid electrolyte membrane may comprise the electrolyte material according to the present disclosure, and may further comprise other electrolyte materials as described below.

In the present disclosure, the positive electrode and the negative electrode include a current collector and an electrode active material layer on at least one surface of the current collector, and the active material layer comprises a plurality of electrode active material particles and an electrolyte material. The positive electrode and the negative electrode may comprise the electrolyte material according to the present disclosure as the electrolyte material, and may further comprise other electrolyte materials as described below.

Additionally, each electrode may further comprise at least one of a conductive material or a binder resin where necessary. Additionally, the electrode may further comprise various types of additives to supplement or improve the physical and chemical properties of the electrode.

In the present disclosure, the negative electrode active material may comprise lithium metal as the negative electrode active material for lithium ion secondary batteries, and besides, the negative electrode active material may include any other material that can used for the negative electrode active material. For example, the negative electrode active material may further comprise one or more selected from carbon such as non-graphitizable carbon and graphite-based carbon; metal composite oxide such as $Li_xFe_2O_3$ ($0\leq x\leq 1$), $Li_xWO_2$ ($0\leq x\leq 1$), or $Sn_xMe_{1-x}Me'_yO_z$ (Me: Mn, Fe, Pb, Ge; Me': Al, B, P, Si, Group I, Group II and Group III elements of the periodic table, halogen, $0<x\leq 1$; $1\leq y\leq 3$; $1\leq z\leq 8$); lithium alloys; silicon-based alloys; tin-based alloys; metal oxide such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$ or $Bi_2O_5$; conductive polymer such as polyacetylene; Li—Co—Ni based materials; titanium oxide; and lithium titanium oxide.

When the electrode is a positive electrode, the electrode active material may include, without limitation, any type of positive electrode active material for lithium ion secondary batteries. For example, the positive electrode active material may include layered compounds such as lithium cobalt oxide ($LiCoO_2$) and lithium nickel oxide ($LiNiO_2$) or compounds substituted with one or more transition metals; lithium manganese oxide of formula $Li_{1+x}Mn_{2-x}O_4$ (x is 0 to 0.33), $LiMnO_3$, $LiMn_2O_3$, $LiMnO_2$; lithium copper oxide ($Li_2CuO_2$); vanadium oxide such as $LiV_3O_8$, $LiV_3O_4$, $V_2O_5$, $Cu_2V_2O_7$; Ni-site type lithium nickel oxide represented by formula $LiNi_{1-x}M_xO_2$(M=Co, Mn, Al, Cu, Fe, Mg, B or Ga, x=0.01~0.3); lithium manganese composite oxide represented by formula $LiMn_{1-x}M_xO_2$ (M=Co, Ni, Fe, Cr, Zn or Ta, x=0.01~0.1) or $Li_2Mn_3MO_8$ (M=Fe, Co, Ni, Cu or Zn); lithium manganese composite oxide of spinel structure represented by $LiNi_xMn_{2-x}O_4$; $LiMn_2O_4$ with partial substitution of alkali earth metal ion for Li in Formula; disulfide compounds; or $Fe_2(MoO_4)_3$. However, the positive electrode active material is not limited thereto.

In the present disclosure, the current collector works as electrical conductor, for example, a metal plate, and may include an appropriate one depending on the polarity of the current collector electrode known in the field of secondary batteries.

In the present disclosure, the conductive material is generally added in an amount of 1 weight % to 30 weight % based on the total weight of the mixture comprising the electrode active material. The conductive material is not limited to a particular type and may include those having conductive properties without causing a chemical change in the corresponding battery, for example, one or more selected from graphite such as natural graphite or artificial graphite; carbon black-based carbon materials such as carbon black, acetylene black, Ketjenblack®, channel black, furnace black, lamp black, and thermal black; conductive fibers such as carbon fibers or metal fibers; fluorocarbon; metal powder such as aluminum powder and nickel powder; conductive whiskers such as zinc oxide and potassium titanate; conductive metal oxide such as titanium oxide; and conductive materials such as polyphenylene derivatives.

In the present disclosure, the binder resin is not limited to a particular type and may include any type of component that assists in the binding of the active material and the conductive material and binding to the current collector, and may include, for example, polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene monomer (EPDM), sulfonated EPDM, styrene butadiene rubber, fluorine rubber or a variety of copolymers. The binder resin may be generally included in the range of 1 weight % to 30 weight %, or 1 weight % to 10 weight % based on 100 weight % of the electrode layer.

Meanwhile, in the present disclosure, each electrode active material layer may comprise one or more additives such as an oxidation stabilizer, a reduction stabilizer, a flame retardant, a thermal stabilizer or an antifogging agent where necessary.

In the present disclosure, the all-solid-state battery may comprise a solid electrolyte material according to the present disclosure as a solid electrolyte material. Additionally, the all-solid-state battery may further comprise one or more of a polymer-based solid electrolyte, an oxide-based solid electrolyte or a sulfide-based solid electrolyte.

The polymer-based solid electrolyte is a composite of a lithium salt and a polymer resin, i.e., a polymer electrolyte material formed by adding the polymer resin to the solvated lithium salt, and may exhibit the ion conductivity of about $1\times10^{-7}$ S/cm or more, and preferably, about $1\times10^{-5}$ S/cm or more.

Non-limiting examples of the polymer resin may comprise one or more of polyether-based polymer, polycarbonate-based polymer, acrylate-based polymer, polysiloxane-based polymer, phosphazene-based polymer, polyethylene derivatives, alkylene oxide derivatives such as polyethylene oxide, phosphate ester polymer, poly agitation lysine, polyester sulfide, polyvinyl alcohol, polyvinylidene fluoride or polymer including an ionic dissociable group. Additionally, the polymer electrolyte may comprise, as the polymer resin, one or more of a branched copolymer, comb-like polymer resin or crosslinked polymer resin, obtained by copolymerization of a comonomer of amorphous polymer such as PMMA, polycarbonate, polysiloxane (PDMS) and/or phosphazene with a poly ethylene oxide (PEO) backbone.

In the electrolyte of the present disclosure, the lithium salt is an ionizable lithium salt and may be represented as $Li^+X^-$. The anion of the lithium salt is not limited to a particular type, but may include, for example, $F^-$, $Cl^-$, $Br^-$, $I^-$, $NO_3^-$, $N(CN)_2$, $BF_4^-$, $ClO_4^-$, $PF_6^-$, $(CF_3)_2PF_4^-$, $(CF_3)_3PF_3^-$, $(CF_3)_4$ $PF_2$, $(CF_3)_5PF^-$, $(CF_3)_6P^-$, $CF_3SO_3$, $CF_3CF_2SO_3$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3$, $CF_3CO_2$, $CH_3CO_2$, $SCN^-$ or $(CF_3CF_2SO_2)_2N^-$.

The oxide-based solid electrolyte material contains oxygen 0 and has the ion conductivity of metals that belong to Group I or Group II of the periodic table. Non-limiting examples of the oxide-based solid electrolyte material may comprise one or more selected from LLTO-based compounds, $Li_6La_2CaTa_2O_{12}$, $Li_6La_2ANb_2O_{12}$ (A is Ca or Sr), $Li_2Nd_3TeSbO_{12}$, $Li_3BO_{2.5}N_{0.5}$, $Li_9SiAlO_8$, LAGP-based compounds, LATP-based compounds, $Li_{1+x}Ti_{2-x}Al_xSi_y(PO_4)_{3-y}$ ($0 \leq x \leq 1$, $0 \leq y \leq 1$), $LiAl_xZr_{2-x}(PO_4)_3$ ($0 \leq x \leq 1$, $0 \leq y \leq 1$), $LiTi_xZr_{2-x}(PO_4)_3$ ($0 \leq x \leq 1$, $0 \leq y \leq 1$), LISICON-based compounds, LIPON-based compounds, perovskite-based compounds, NASICON-based compounds and LLZO-based compounds. However, the oxide-based solid electrolyte material is not limited thereto.

The sulfide-based solid electrolyte material contains sulfur S and has the ion conductivity of metals that belong to Group I or Group II of the periodic table, and may comprise Li—P—S based glass or Li—P—S based glass ceramics. Non-limiting examples of the sulfide-based solid electrolyte may include one or more of $Li_2S—P_2S_5$, $Li_2S—LiI—P_2S_5$, $Li_2$ $S—LiI—Li_2O—P_2S_5$, $Li_2S—LiBr—P_2S_5$, $Li_2S—Li_2O—P_2S_5$, $Li_2S—Li_3PO_4—P_2S_5$, $Li_2S—P_2S_5—P_2O_5$, $Li_2S—P_2S_5—SiS_2$, $Li_2S—P_2S_5—SnS$, $Li_2S—P_2S_5—Al_2S_3$, $Li_2S—GeS_2$ or $Li_2S—GeS_2—ZnS$. However, the sulfide-based solid electrolyte is not limited thereto.

Additionally, the present disclosure provides a secondary battery having the above-described structure. Additionally, the present disclosure provides a battery module comprising the secondary battery as a unit battery, a battery pack comprising the battery module, and a device comprising the battery pack as a power source. In this instance, specific examples of the device may include, but is not limited to, electric motor-driven power tools; electric vehicles including Electric Vehicles (EVs), Hybrid Electric Vehicles (HEVs), Plug-in Hybrid Electric Vehicles (PHEVs); electric two wheelers including E-bikes and E-scooters; electric golf carts; and energy storage systems.

EXAMPLE

To create a model for a two-component system electrolyte material comprising chloranil (CHL) and LiTFSI, ab initio molecular dynamics (AIMD) simulation is performed, and the ion conductivity of the electrolyte material is calculated using computational chemistry. In the simulation, the CHL/LiTFSI ratio is 0, 1, 2, 3, and the number of molecules of CHL and LiTFSI in a supercell for each composition is shown in FIG. 8.

For better statistical processing, three different model structures for each CHL/LiTFSI ratio are formed. Before all production runs, a bulk electrolyte system is allowed to come to volumetric equilibration of NPT ensemble at 300K under 1 atm and AIMD simulation is performed in the canonical NVT ensemble using the Nose-Hoover thermostat. For fast local structure rearrangement, each simulation supercell is annealed at 700K for 5 ps (time step: ifs) and cooled down to 350K at the rate of 0.7K/fs. The cooling process is followed by additional optimization with conjugate-gradient energy minimization using density-functional theory calculation for each two-component system electrolyte material.

Figure 2A:
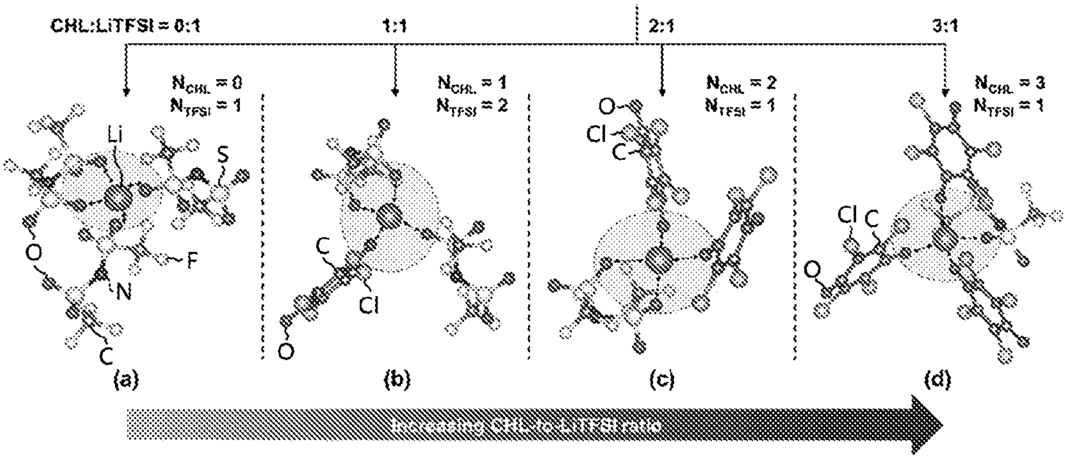
FIGS. 2*a*, 2*b* and 2*c* show the changes in coordination number of oxygen atoms (O) that surround lithium with respect to CHL/LiTFSI ratio for a CHL/LiTFSI two-component system electrolyte material produced by AIMD simulation.

FIG. 1 shows the molecular arrangement model of the CHL/LiTFSI two-component system electrolyte material obtained through AIMD simulation. In FIG. 1, lithium (Li), oxygen (O), carbon (C), sulfur (S), nitrogen (N), fluorine (F) and chloride (Cl) are separately shown. FIG. 2*a* shows the molecular arrangement near lithium when the CHL/LiTFSI molar ratio is 0, 1, 2, 3. In FIG. 2*a*, $NcH_L$ and NTFsj indicate the number of CHL and TFSI near lithium, respectively.

It can be seen from FIG. 1 that the lithium atom is surrounded by the oxygen atoms O of TFSI or the oxygen atoms O of CHL. In this instance, the oxygen atoms near Li may be classified into three types, $O_{CHL}$, $O_{TFSI-A}$ and $O_{TFSI-B}$. Here, $O_{CHL}$ indicates two oxygen atoms present in CHL, $O_{TFSI-A}$ indicates two oxygen atoms present in TFSI having direct bonds with the same lithium, and $O_{TFSI-B}$ indicates the remaining two oxygen atoms present in TFSI.

Figure 2B:
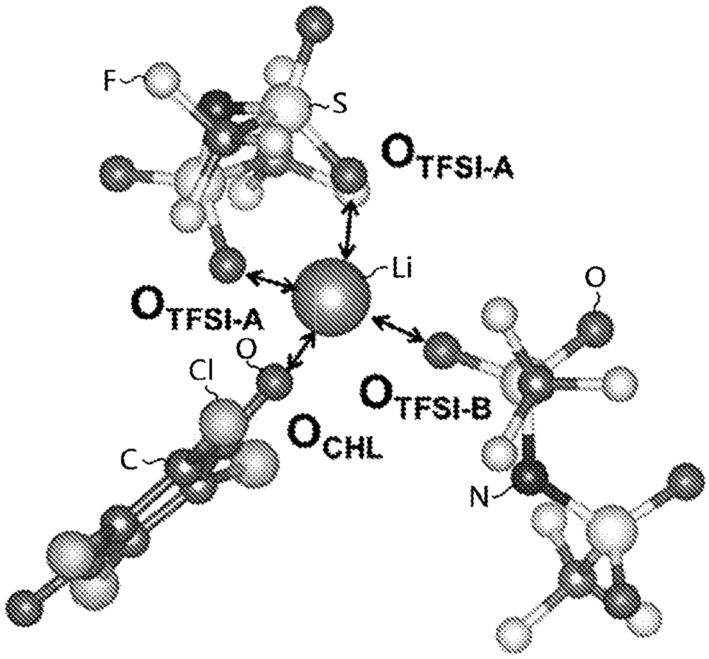

Referring to FIG. 2*a*, when the molar ratio of CHL:LiTFSI is 0:1, Li is surrounded by three TFSI through bonds with four oxygen atoms. That is, four oxygen atoms near Li include two $O_{TFSI-AS}$ present in the same TFSI and each one $O_{TFSI-B}$ respectively present in two different TFSIs. When the total number of oxygen atoms (O) coordinated near Li is defined as the total coordination number $CN_{Total}$ and $CN_{TFSI-A}$, $CN_{TFSI-B}$, $CN_{CHL}$ are defined as the number of $O_{TFSI-A}$, $O_{TFSI-B}$, $O_{CHL}$ that surrounds the lithium atom, respectively, where $N_{CHL}=0$, i.e., when LiTFSI alone is used as the electrolyte, the total coordination number $CN_{Total}$ of Li atom is 4, and more specifically, $CN_{TFSI-A}=2$, $CN_{TFSI-B}=2$, $CN_{CHL}=0$. FIG. 2*b* shows the molecular arrangement of the model, $N_{CHL}=1$, $N_{TFSI}=2$, and $CN_{TFSI-A}$, $CN_{TFSI-B}$, and $CN_{CHL}$ show $CN_{TFSI-A}=2$, $CN_{TFSI-B}=1$, $CN_{CHL}=1$, respectively.

To acquire statistical information about the interactions between lithium and the oxygen atoms near the lithium, a coordination number analysis of the CHL/LiTFSI two-component system electrolyte material is conducted. For each lithium, it is assumed that the O atom corresponding to the first peak of Radial Distribution Function (RDF) of the Li—O pair is coordinated to Li.

Figure 2C:
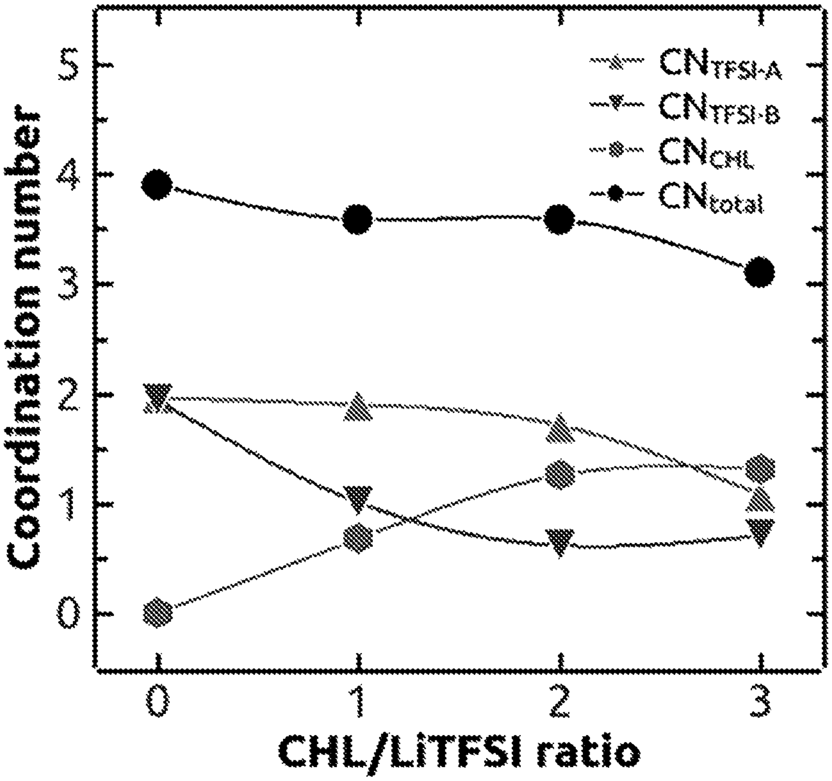

FIG. 2*c* shows the mean coordination number of $CN_{TFSI-A}$, $CN_{TFSI-B}$, $CN_{CHL}$ and $CN_{total}$. Referring to FIG. 2*c*, as the CHL/LiTFSI ratio increases, the total coordination number and the O coordination number of TFSI decreases, and the O coordination number of CHL increases. Specifically, as the CHL/LiTFSI ratio goes from 0 to 3, $CN_{CHL}$ increases from 0 and converges to about 1.3, and $CN_{TFSI-B}$ decreases from 2 and converges to about 0.62. However, it is found that when the CHL/LiTFSI ratio increases from 0 to 2, $CN_{TFSI-A}$ does not show a substantial reduction (when the CHL/LiTFSI ratio is 0, 1 and 2, the $CN_{TFSI-A}$ value shows 2.0, 1.9 and 1.7, respectively), and when the CHL/LiTFSI ratio is higher than 2, the $CN_{TFSI-A}$ value is 1.08, showing a sharp reduction.

It is inferred through the foregoing results that when the CHL/LiTFSI ratio is equal to or less than about 2, the coordination of Li—$O_{TFSI-B}$ is replaced with the coordination of Li—$O_{CHL}$, while when the CHL/LiTFSI ratio is higher than about 2, the coordination of Li—$O_{TFSI-A}$ is replaced with the coordination of Li—$O_{CHL}$. When considering that $CN_{TFSI-A}$ reduces by the decomposition of LiTFSI into Li cation and TFSI anion, it is found from the foregoing results that when the CHL/LiTFSI ratio is higher than about 2:1, the lithium salt dissociates better.

Meanwhile, for the solid composite electrolyte with the adjusted CHL/LiTFSI molar ratio of 0, 1, 2, 3, the ion conductivity is calculated through molecular dynamics (MD) simulation. The diffusion coefficient of lithium cation and TFSI anion is calculated through mean square displacement (MSD) analysis, and the ion conductivity is calculated from the diffusion coefficient using the Nemst-Einstein equation.

In case that MSD is calculated at room temperature to calculate the diffusion coefficient of lithium cation and TFSI anion at room temperature, it takes a long simulation time. In this calculation, MSD is calculated at high temperature (400K, 425K, 450K, 475K, 500K), the diffusion coefficient is calculated from the MSD, and the diffusion coefficient at room temperature (25° C.) is calculated by Arrhenius plots.

Figure 3A:
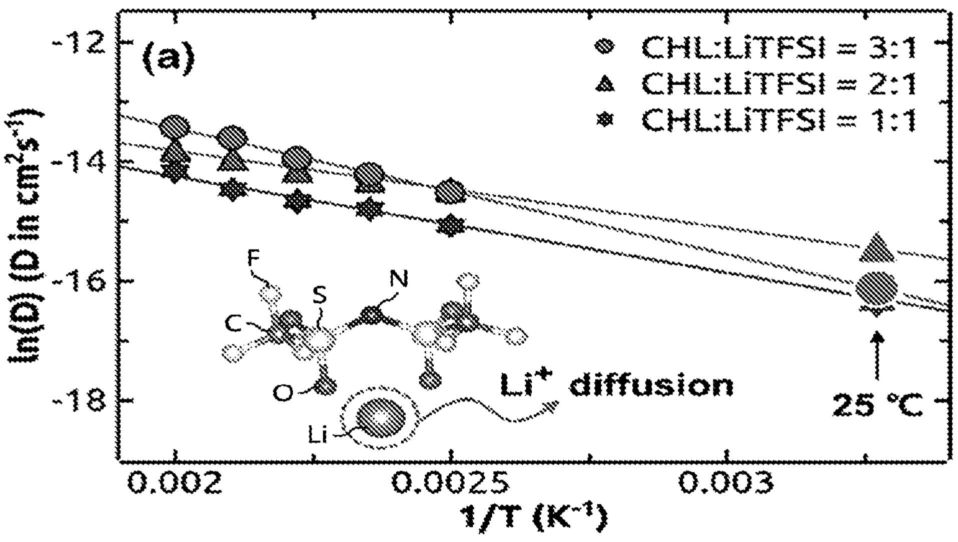
FIG. 3*a* shows a graph of lithium ion diffusion coefficient vs. temperature in a CHL/LiTFSI solid electrolyte.
Figure 3B:
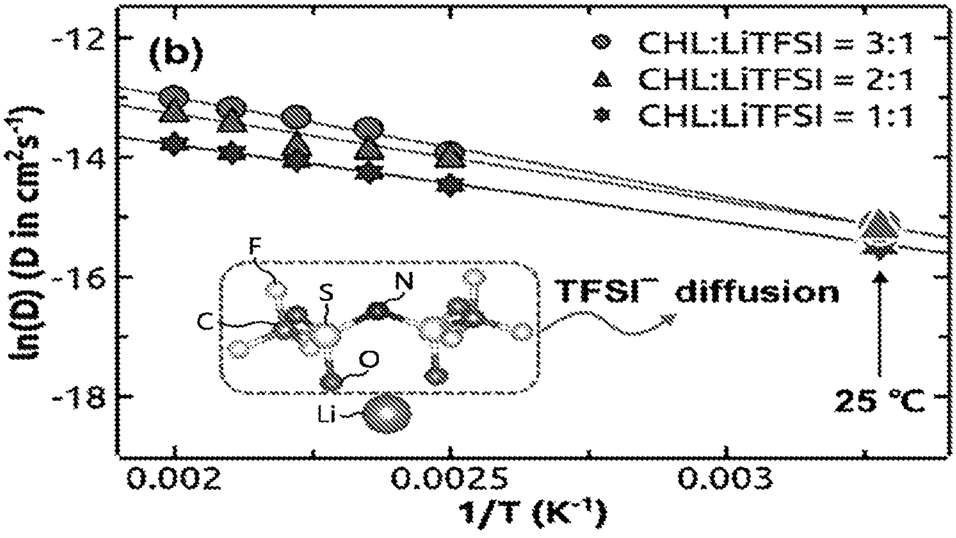
FIG. 3*b* shows a graph of TFSI anion diffusion coefficient vs. temperature in a CHL/LiTFSI solid electrolyte.

FIGS. 3*a* and 3*b* show the lithium ion diffusion coefficient (FIG. 3*a*) and the TFSI anion diffusion coefficient (FIG. 3*b*), respectively. Where CHL/LiTFSI=0, the diffusion coefficient of lithium and TFSI is negligibly low and thus is excluded from the drawings.

Figure 4A:
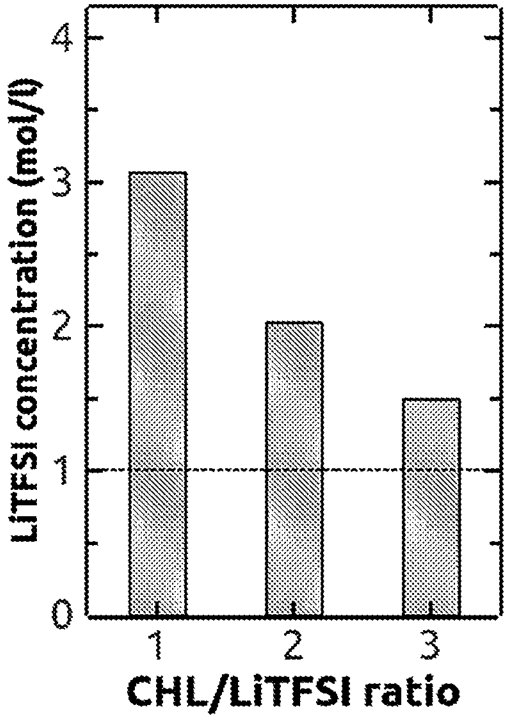
FIG. 4*a* shows a graph of LiTFSI concentration vs. CHL/LiTFSI ratio.

FIG. 4*a* shows a graph of the LiTFSI concentration vs. CHL/LiTFSI ratio. It can be seen that as the amount of chloranil increases, the LiTFSI concentration per volume decreases.

Figure 4B:
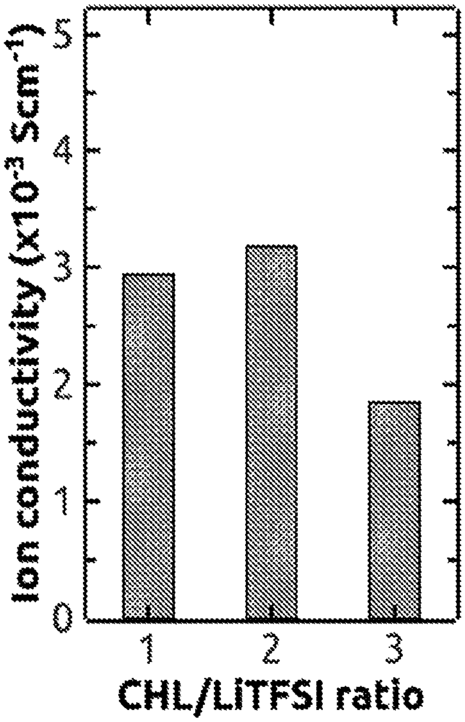
FIG. 4*b* shows a graph of ion conductivity of a solid electrolyte vs. CHL/LiTFSI ratio.

FIG. 4*b* shows a graph of the ion conductivity calculated from the diffusion coefficient vs. CHL/LiTFSI ratio. It can be seen that as the CHL/LiTFSI ratio increases from 1 to 2, the ion conductivity increases, and when the CHL/LiTFSI ratio increases from 2 to 3, the ion conductivity decreases.

FIG. 9 shows the lithium cation conductivity (unit: S/cm) and the TFSI anion conductivity (unit: S/cm) at room temperature (25° C.), the overall ion conductivity and the lithium cation transference number with respect to CHL/LiTFSI molar ratio. When there is no CHL, the lithium cation conductivity shows a value that is almost close to 0, and as CHL is added, there is a significant increase. As the CHL concentration relative to LiTFSI increases, the ion conductivity increases, but the Li concentration relative to the total volume reduces, and thus it can be seen that the ion conductivity shows the highest value at the CHL/LiTFSI molar ratio of about 2.

Figure 5A:
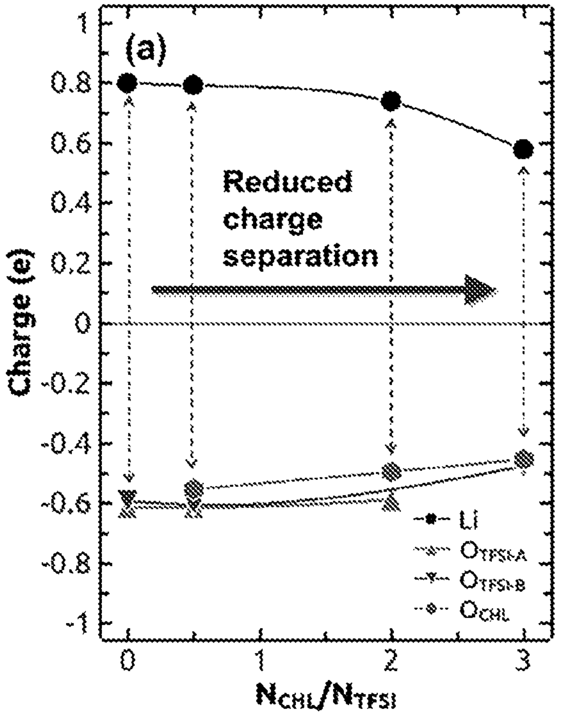
FIG. 5*a* shows a graph of partial charge vs. $N_{CHL}/N_{TFSI}$.
Figure 5B:
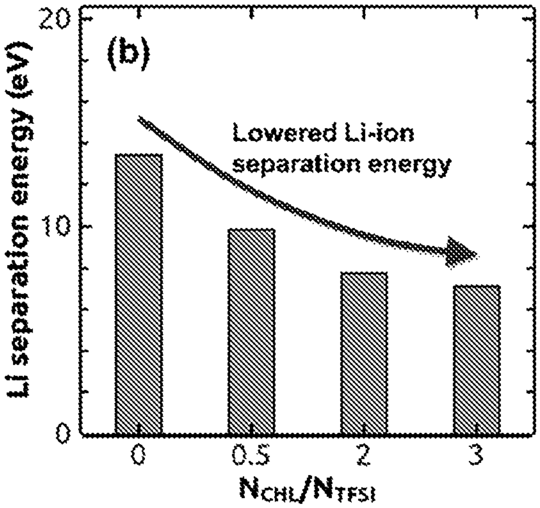
FIG. 5*b* shows a graph of Li separation energy vs. $N_{CHL}/N_{TFSI}$.

FIGS. 5*a* and 5*b* respectively show a graph of partial charge vs. $N_{CHL}/N_{TFSI}$ and a graph of Li separation energy vs. $N_{CHL}/N_{TFSI}$. It can be seen that as the CHL concentration increases from 0 to 3, the Li separation energy decreases and the lithium salt dissociates more easily.

Figure 6A:
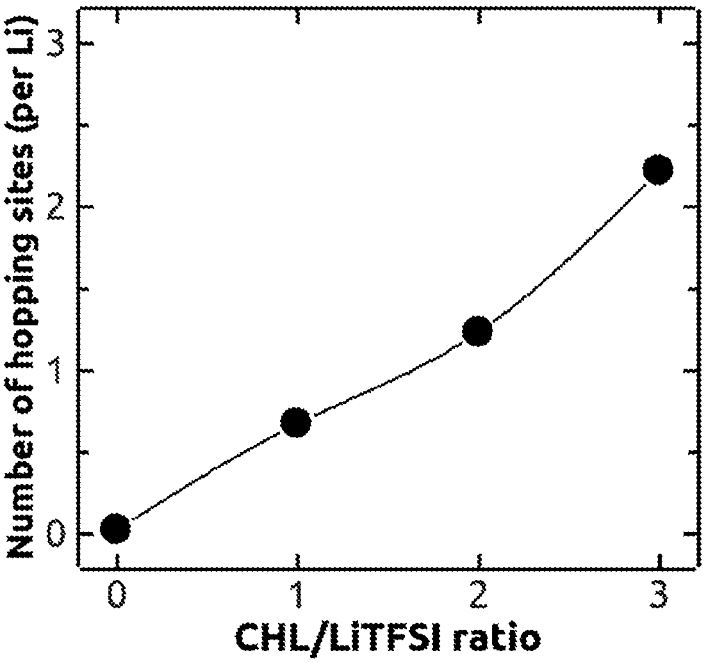
Figure 7:
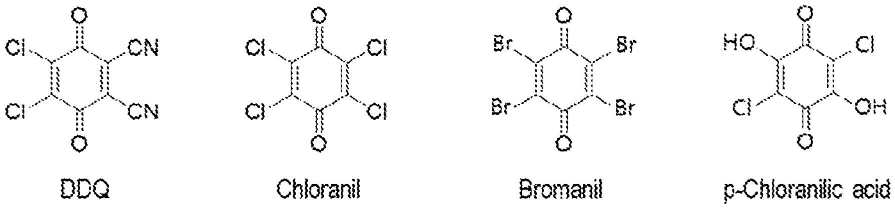
FIG. 7 shows chemical formulas representing the structure of DDQ, bromanil and p-chloranilic acid.

FIGS. 6*a* and 6*b* show the number of lithium ion hopping sites with respect to CHL/LiTFSI ratio. It can be seen that when CHL/LiTFSI ratio increases from 0 to 3, the number of lithium ion hopping sites increases from 0 to about 2. The lithium ion hopping site is a vacancy site of O atoms not coordinating with Li, and may be referred to as cage of O atoms. The cage comprises three to four O atoms.

Comparative Example

Lithium Ion Diffusion Coefficient and Ion Conductivity of CHL/LiTFSI/PPS Three-Component System Electrolyte To investigate the influence of PPS on the ion conductivity in the chloranil-LiTFSI ion conducting channel, PPS polymer (Mw 5486 g/mol) interface is created in CHL:LiTFSI=3:1 ion conducting channel layers to see the chloranil-LiTFSI/PPS interface effect.

Figure 10:
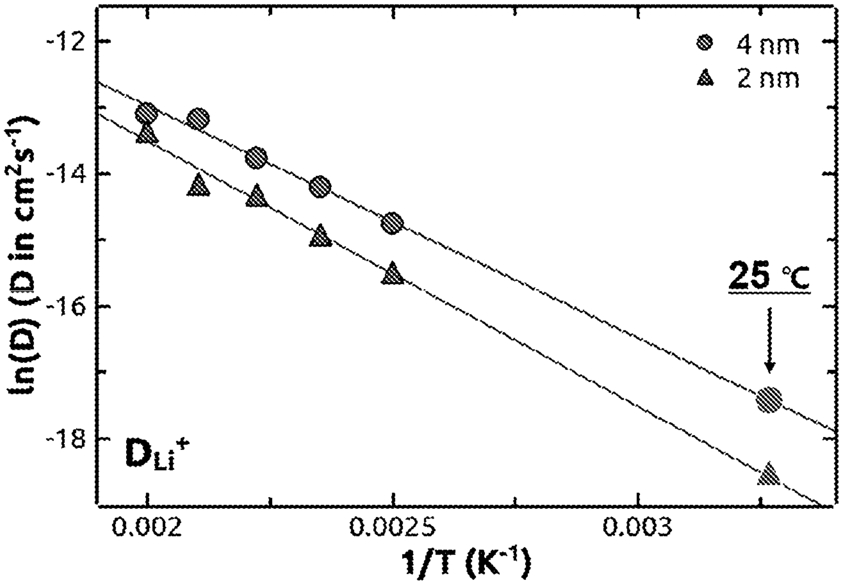
FIG. 10 shows a graph of the calculated $Li^+$ ion diffusivity (D) vs. temperature with changes in CHL-LiTFSI layer thickness at CHL-LiTFSI/PPS interface.

FIG. 10 shows the ion diffusion coefficient with respect to thickness of chloranil-LiTFSI ion conducting channel in the Li+ slab structure. Here, it is found that Li+ ion diffusion coefficient is greatly affected by the thickness of the chloranil-LiTFSI ion conducting channel, and as the thickness of the ion conducting channel increases, the ion diffusion coefficient increases. This means that the chloranil-LiTFSI/PPS interface is effective in the suppression of lithium ion diffusion.

As a result, it can be seen that the thicker chloranil-LiTFSI ion conducting channel shows significantly improved ion conductivity compared to the thinner chloranil-LiTFSI ion conducting channel as shown in FIGS. 10 and 11.

In FIG. 11, the overall conductance is a value when the area of the electrolyte is 1 $cm^2$ and the thickness is 20 μm. This reveals that polymer such as PPS is not an essential component for ion conductivity, and ion conduction can occur well in the two-component system solid electrolyte material of the lithium salt and the electrophilic molecule without the polymer.

What is claimed is:

1. An electrolyte material for an all-solid-state battery, wherein the electrolyte material is a two-component system consisting only of a lithium salt and an electrophilic molecule, wherein the electrophilic molecule is a compound which is electrically neutral, comprises an oxygen atom (O), and has a chemical resonance structure, and wherein the lithium salt comprises lithium bis(fluorosulfonyl)imide (LiFSI), lithium bis(trifluoromethanesulfonyl)imide (LiTFSI), lithium bis(pentafluoroethanesulfonyl)imide (LiBETI), LiCTFSI ($LiN(C_2F_4S_2O_4)$), $LiN(CN)_2$, $LiBF_4$, $LiClO_4$, $LiPF_6$, $Li(CF_3)_2PF_4$, $Li(CF_3)_3PF_3$, $Li(CF_3)_4PF_2$, $Li(CF_3)_5PF$, $Li(CF_3)_6P$, $LiCF_3SO_3$, $LiCF_3CF_2SO_3$, $LiCF_3CF_2(CF_3)_2CO$, $Li(CF_3SO_2)_2CH$, $(SF_5)3C$, $Li(CF_3SO_2)_3C$, $LiCF_3(CF_2)_7SO_3$, $LiCF_3CO_2$, $LiCH_3CO_2$, LiSCN or two or more thereof.

2. The electrolyte material according to claim 1, wherein the electrolyte material is free of a polymer.

3. The electrolyte material according to claim 1, wherein the lithium salt, consists of LiTFSI.

4. The electrolyte material according to claim 1, wherein a molar ratio of the electrophilic molecule to the lithium salt, the electrophilic molecule/the lithium salt, is 1 to 3.

5. The electrolyte material according to claim 1, wherein the electrophilic molecule consists of a benzoquinone-based compound, and the lithium salt consists of LiTFSI, and a molar ratio of the electrophilic molecule to the lithium salt, the electrophilic molecule/the lithium salt, is 1 to 3.

6. The electrolyte material according to claim 1, wherein the electrophilic molecule consists of a benzoquinone-based compound.

7. The electrolyte material according to claim 6, wherein one or more hydrogens of the benzoquinone-based compound are each independently substituted with a functional group having a cyano group (CN), chloride (Cl) or bromide (Br).

8. The electrolyte material according to claim 1, wherein the electrophilic molecule is one or more selected from the group consisting of benzoquinone, 2,3-dicyano-5,6-dichlorobenzoquinone (DDQ), chloranil, bromanil, and p-chloranilic acid.

9. The electrolyte material according to claim 8, wherein the electrophilic molecule consists of chloranil.

10. The electrolyte material according to claim 1, wherein the electrolyte material consists of LiTFSI as the lithium salt, and chloranil as the electrophilic molecule.

11. The electrolyte material according to claim 10, wherein the electrolyte material consists of LiTFSI as the lithium salt and chloranil as the electrophilic molecule, and a molar ratio of the electrophilic molecule to the lithium salt, the electrophilic molecule/the lithium salt, is 1 to 3.

12. An all-solid-state battery comprising a negative electrode, a positive electrode and a solid electrolyte membrane between the negative electrode and the positive electrode, wherein the solid electrolyte membrane consists essentially of the electrolyte material according to claim 1.

* * * * *